Patented Apr. 24, 1928.

1,667,073

UNITED STATES PATENT OFFICE.

PAUL KREISMANN, OF CHICAGO, ILLINOIS.

GLUE AND PROCESS OF MAKING SAME.

No Drawing.    Application filed March 28, 1921.  Serial No. 456,193.

The object of my invention is to provide a glue of superior quality which can be used as a substitute for animal glue in veneer, joint and other work; and also to provide a simple process for making the glue in an inexpensive and convenient manner.

I have found that potato starch and clay form a base which, when converted, produces a glue of superior quality which seems to act like a cement and is very satisfactory for all kinds of work. The extensive tests which I have made and the commercial use of the invention lead me to believe that starch of potatoes is the best kind of starch for this purpose. Tapioca, sago, wheat and corn starches may be used but the quality of the glue will, of course, vary with the quality of the starch.

In the manufacture of potato starch as usually practiced at the present time, the potatoes are crushed or reduced to a finely divided condition and then treated with cold water to separate the starch from the fibre. The starch is then dried in some approved manner and the fibrous pulp residue has heretofore been disposed of as waste material. Since potatoes grown in this country consist of approximately 78 parts water, 13 parts starch and 9 parts fibrous residue by weight there is at hand an ample supply of this fibrous residue available for use in accordance with my invention.

Glue is used for many different purposes and the quality of glue required varies with the character of the work. According to my present investigations I have found that a base for making glue can be satisfactorily produced with a mixture, preferably dry, of 90 to 50 pounds of starch and 10 to 50 pounds of clay to which is added 2 to 5 pounds of a suitable alkali caustic soda for example for every 100 pounds of the mixture of starch and clay.

I have found that kaolin, which is a high grade form of clay, used in the manufacture of porcelain and china is a very satisfactory clay material to use, and I have also used other clays and also other materials, such as whiting, which, for my purpose seemed to be equivalents in a greater or lesser degree, and I therefore desire to include within the general term "clay" not only kaolin and other suitable clays but also all equivalent material suitable for the purpose.

My experience is that for especially high class work a glue base having about 88 pounds of potato starch, 12 pounds of kaolin and 5 pounds of alkali produces an especially satisfactory glue. For paste board boxes, shooks and other common work a satisfactory glue may be made with a base composed of 50 pounds of potato starch, 50 pounds of clay and 3 to 5 pounds of alkali.

A heavy bodied glue is desired for porous woods and soft materials and a low bodied glue is desired for hard woods and other hard materials.

I may use from 250 to 400 pounds of water to 100 pounds of the mixture; the proportions varying according to the character of the glue desired. I recommend the use of 265 to 275 pounds of water to every 100 pounds of the high grade mixture. The water content in a low grade mixture for common work may run up to 400 pounds to 100 pounds of the mixture. If the proportion of water for a given mixture is increased to thin the glue it will correspondingly reduce the body. To avoid this I propose to add a quantity of finely ground potato fibre which will preserve the desired body for the glue and at the same time permit the addition of water. In other words I find that by the addition of finely ground potato fibre to the glue base the proportion of water can be considerably increased to provide a solution having the heavy body of a high grade glue suitable for medium and common work.

In preparing the glue I have found it satisfactory to proceed as follows:

I preferably use a kettle having a steam jacket and an agitator and operate the agitator throughout the process. I use from 250 to 500 pounds of cold water to 100 pounds of the base. The cold water is first put in the kettle, the agitator operating, then the base is added and steam is admitted to the jacket to raise the temperature preferably to 144° F. The alkali is dissolved in cold water in the proportion of one part of alkali to about three parts of water by weight, and this solution is then slowly added to the mixture in the kettle in the proportion of 3 to 5 pounds of alkali to 100 pounds of the base. Meanwhile the temperature is raised to 165° F. or thereabouts. My experience has been that the best results are obtained when the temperature has reached about 165° F., but it is well known that conversion will take place at a lower temperature as well as at a somewhat higher temperature. The conversion will be indicated when the solution will run off of a paddle or a stick in a long tenacious thread, whereupon the steam is turned off and cold water admitted to the jacket to slowly cool the mass to room temperature, from 70° to 100° F. or thereabouts, ready for use. I have referred to a jacketed kettle as a convenient means for practicing the process but any other means suitable for the purpose may be employed.

If the alkali is first mixed with the base, in a dry state and as a part thereof, either by the manufacturer or by the consumer, this base is added to the water in the kettle and the temperature is raised sufficiently to effect the conversion as heretofore described.

The proportions herein mentioned are those which my present investigations and practical work with the improved glue and process have proved to produce what I now consider to be the most satisfactory results, but it will be understood by those skilled in the art that the proportions of the materials and the temperatures may be varied as will be found desirable according to the character and quality of the materials used, the grade of glue desired and the conditions of manufacture.

I prefer to prepare a base of potato starch and clay, with or without the fibrous material and the alkali, as before described, but if desired these materials may be supplied separately and combined for the first time in the kettle. The starch, clay, fibrous material and alkali may be put in the kettle in any order desired. I use clay pulverized to a powder and free from grit, because it enables it to carry more water, makes the glue dry and set faster, increases the efficiency and spread of the glue and prevents water stains.

My invention provides a glue of superior quality for all kinds of work. The glue is creamy, almost white in appearance, which is a quality greatly appreciated in the trade because it facilitates gluing work. The glue is quick setting, which is especially desirable for work during hot weather and the glue has improved qualities which makes it desirable in the trade.

I claim:

1. The process of making vegetable glue which consists in mixing potato starch, clay, water and an alkali, and subjecting the mixture to heat until the mixture is rendered semi-fluid by conversion.

2. The process of making vegetable glue which consists in mixing potato starch, potato fibre, clay, water and an alkali, and subjecting the mixture to heat until the mixture is rendered semi-fluid by conversion.

3. The process of making vegetable glue which consists in mixing potato starch, clay, an alkali and water in or about the proportions of 90 to 50 pounds of potato starch, and 10 to 50 pounds of clay with 3 to 5 pounds of alkali and adding 250 to 400 pounds of water to 100 pounds of the above mixture, agitating and raising the temperature of said mixture to approximately 165° F. until the mixture is converted and then cooling the mixture.

PAUL KREISMANN.